United States Patent
Brunneke et al.

(10) Patent No.: US 8,550,740 B2
(45) Date of Patent: Oct. 8, 2013

(54) PIVOT ARRANGEMENT

(75) Inventors: Hans-Gerd Brunneke, Georgsmarienhutte (DE); Christian Lösche, Stemwede (DE); Werner Schmudde, Bersenbruck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 227 days.

(21) Appl. No.: 12/178,019

(22) Filed: Jul. 23, 2008

(65) Prior Publication Data

US 2009/0028632 A1 Jan. 29, 2009

(30) Foreign Application Priority Data

Jul. 27, 2007 (DE) .................. 10 2007 035 654

(51) Int. Cl.
*F16B 7/10* (2006.01)

(52) U.S. Cl.
USPC .............................. 403/50; 403/51; 277/634

(58) Field of Classification Search
USPC ............. 403/50, 51; 277/634–636; 464/173, 464/175; 74/18, 183.1, 18.2; 267/147
See application file for complete search history.

(56) References Cited

U.S. PATENT DOCUMENTS

| 3,012,546 | A | * | 12/1961 | Heintzmann et al. | .......... 74/18.2 |
| 4,422,483 | A | * | 12/1983 | Zins | .......... 139/420 R |
| 4,925,709 | A | * | 5/1990 | Shmueli | .......... 428/33 |
| 4,930,832 | A | * | 6/1990 | Shelton | .......... 296/107.09 |
| 5,145,191 | A | | 9/1992 | Stewart et al. | |
| 5,501,894 | A | * | 3/1996 | Lagemann et al. | .......... 428/57 |
| 5,676,384 | A | * | 10/1997 | Culpepper | .......... 277/342 |
| 6,808,176 | B2 | * | 10/2004 | Billig et al. | .......... 273/400 |
| 2004/0037619 | A1 | * | 2/2004 | Brunneke et al. | .......... 403/122 |
| 2007/0131323 | A1 | * | 6/2007 | Stewart-Stand | .......... 150/131 |
| 2007/0298666 | A1 | * | 12/2007 | Kurth | .......... 442/1 |

FOREIGN PATENT DOCUMENTS

| DE | 1604418 | 9/1970 |
| DE | 2714983 | 10/1978 |
| DE | 10249073 B4 | 5/2004 |
| EP | 0 347 061 A1 | 12/1989 |

* cited by examiner

*Primary Examiner* — Victor MacArthur
(74) *Attorney, Agent, or Firm* — Cheryl F. Cohen; Christa Hildebrand

(57) ABSTRACT

A joint and/or bearing arrangement (1) with a pivot pin (2), in particular with a pivot pin (2) having a head region (3) which is movable with respect to a receiving joint socket (4), wherein the pivot pin (2) is at least partially surrounded by a circumferential sealing collar (7), is configured so that the outside of the sealing collar (7) is covered by a separate protective cover (11) which conforms to the shape of the sealing collar.

16 Claims, 7 Drawing Sheets

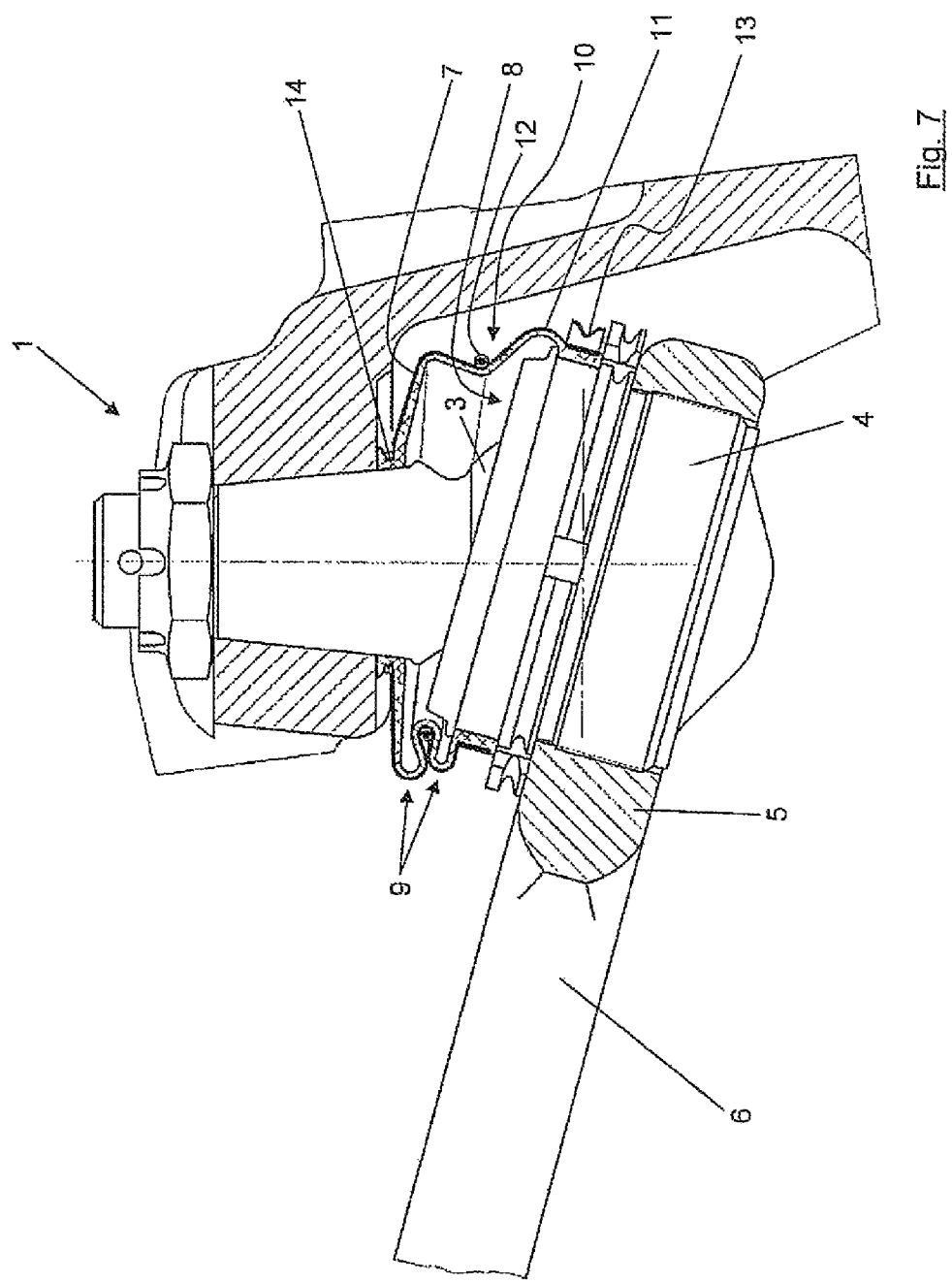

PIVOT ARRANGEMENT

Figure 1:
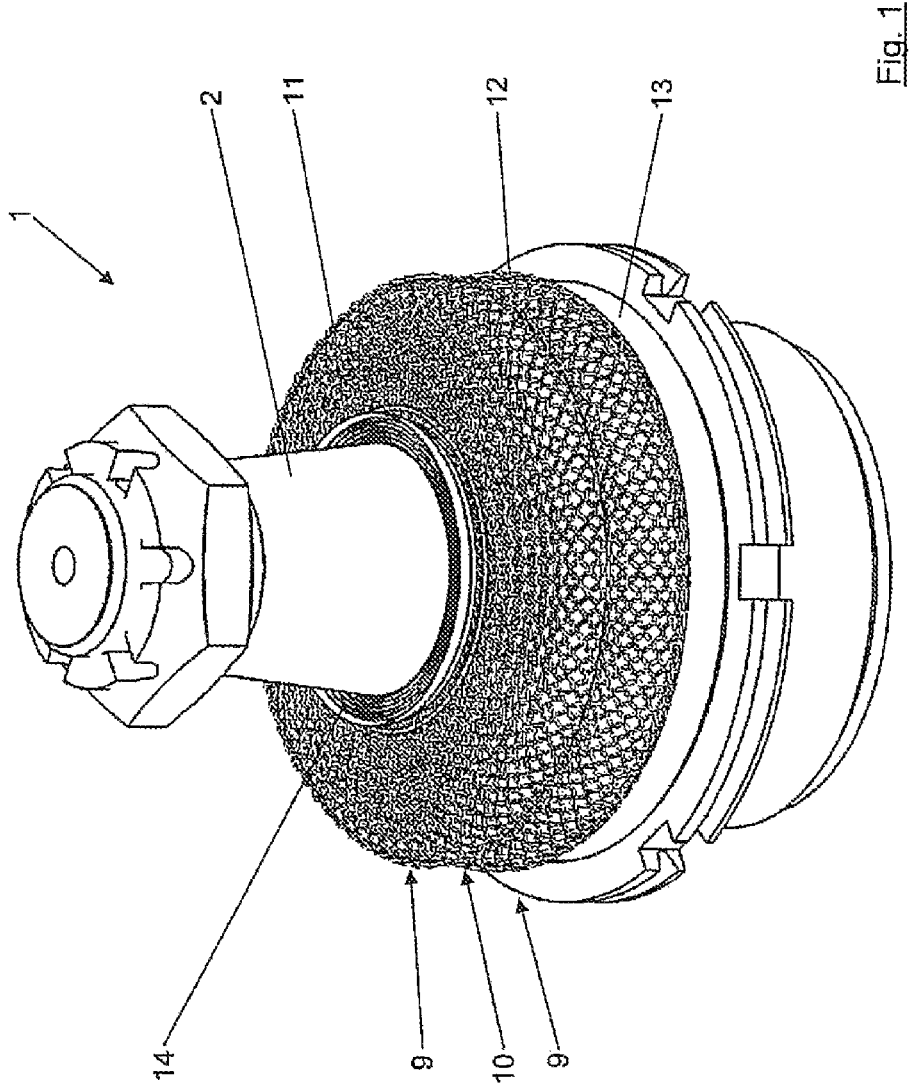

BACKGROUND OF THE INVENTION (1) Field of the Invention

The invention relates to a joint and/or bearing arrangement according to the preamble of claim 1 as well as a motor vehicle with one or several joint and/or bearing arrangements of this type, in particular in chassis and/or for steering components.

(2) Description of Related Art

In joint arrangements having a moveably supported pin, for example a pin having an enlarged head region which is supported for relative movement in a joint socket, the region between the head region and the socket subjected to friction must be well sealed against incursion of particles and/or humidity. It is known to surround a large area of the pin over in the axial direction with a sealing collar made of an elastic material such as to allow the sealing collar to conform to the movement of the pin. A sealing collar of this type can be flexibly deformed when constructed as a bellow with ring-shaped bulges and intermediate undercuts.

When such joint and/or bearing arrangements are installed in vehicles, particularly for use in forestry and/or all-terrain vehicles, for example in tractors, off-road vehicles, Unimogs, military vehicles and the like, the covers of the joint and/or bearing arrangements are frequently at risk of suffering external mechanical damage, for example by stones or branches, in particular with freestanding axles.

For protection, DE 102 49 073 A1 proposes to construct the sealing collars of several layers and to provide in addition to a softer inner layer a more stable outer layer. However, this solution reaches its limits with bellow-shaped covers that have large differences in diameter between the protruding bulges and the undercuts, in particular when the pin excursion should have a large angular range, because the outer layer then lacks sufficient elasticity.

U.S. Pat. No. 5,145,191 discloses to surround a sealing bellow having several ring-shaped folds with a bell-shaped outer cover spaced from the ring-shaped folds. However, this type of cover limits the excursion of the bellow. In addition, a greater pin excursion introduces severe wear due to friction at points between the outwardly protruding rings and the bell-shaped cover.

BRIEF SUMMARY OF THE INVENTION

The invention addresses the problem by protecting a sealing collar in articulated joints having movable pins from external damage with the least possible reduction in the movement of the pin.

The invention solves this problem with a joint or bearing arrangement with the features of claim 1 and with a motor vehicle with the features of claim 13. Advantageous embodiments and modifications of the invention are recited in the additional claims 2 to 12 and 14.

The object is obtained with the invention with a separate protective cover which is placed around the sealing collar and conforms to the shape of the sealing collar. Forming the cover separately allows the cover to move relative to the sealing collar, enabling a large pin excursion. Unlike with a co-extruded outer layer or with a more or less rigid outer bell, movement is not restricted. An injection molded bellow can also be easily unmolded, because the protective cover is placed only over the finished bellow.

More particularly, the protective cover advantageously forms a pierce protection, which prevents damage from sharp rocks, branches, and the like.

By constructing the protective cover so as to surround the sealing collar along its entire circumference similar to a tubular cover, the protective cover can be formed without a longitudinal seam and can hence protect against mishaps regardless of their direction.

The protective cover can readily match the shape of the bellow if the protective cover itself is elastic, thus permitting over its course regions with different diameters.

Advantageously, the installed protective cover is arranged so as to contact the outer surface of the sealing collar, resulting in uniform friction between these components, without forming sharp points, for example, on the outwardly protruding ring-shaped regions of the bellow.

Advantageously, the protective cover may be constructed to conform to the fold pattern of a bellow-shaped sealing collar and secured in radially inwardly oriented folds of the bellow by outer spring rings.

The protective cover is formed particularly stable and wear-resistant when constructed of a metallic material, in particular stainless steel, or a carbon fiber fabric. For improved conformity, the protective cover may include a steel ring fabric, which is known, for example, as pierce protection for butcher shop utensils. Such material can be designed to closely match narrow undercuts.

Individual rings of this fabric can have a ring diameter of three to four millimeters for each ring, with the protective cover having a total thickness from one to three millimeters, thereby forming a stable pierce protection device.

Alternatively, the protective cover made be constructed of a steel or carbon fiber fabric with intersecting threads.

Due to its high elasticity, the protective cover can be attached to both axial ends of the sealing collar with ring-shaped fastening elements, without restricting joint movement.

Because the protective cover is not affixed to the sealing collar across the contact area, existing sealing systems can advantageously be retrofitted with the protective cover.

Advantageous embodiments and features of the invention can be deduced from the subsequently described exemplary embodiments of the subject matter of the invention, which are also shown in the drawings.

BRIEF DESCRIPTION OF THE SEVERAL VIEWS OF THE DRAWING(S)

Figure 2:
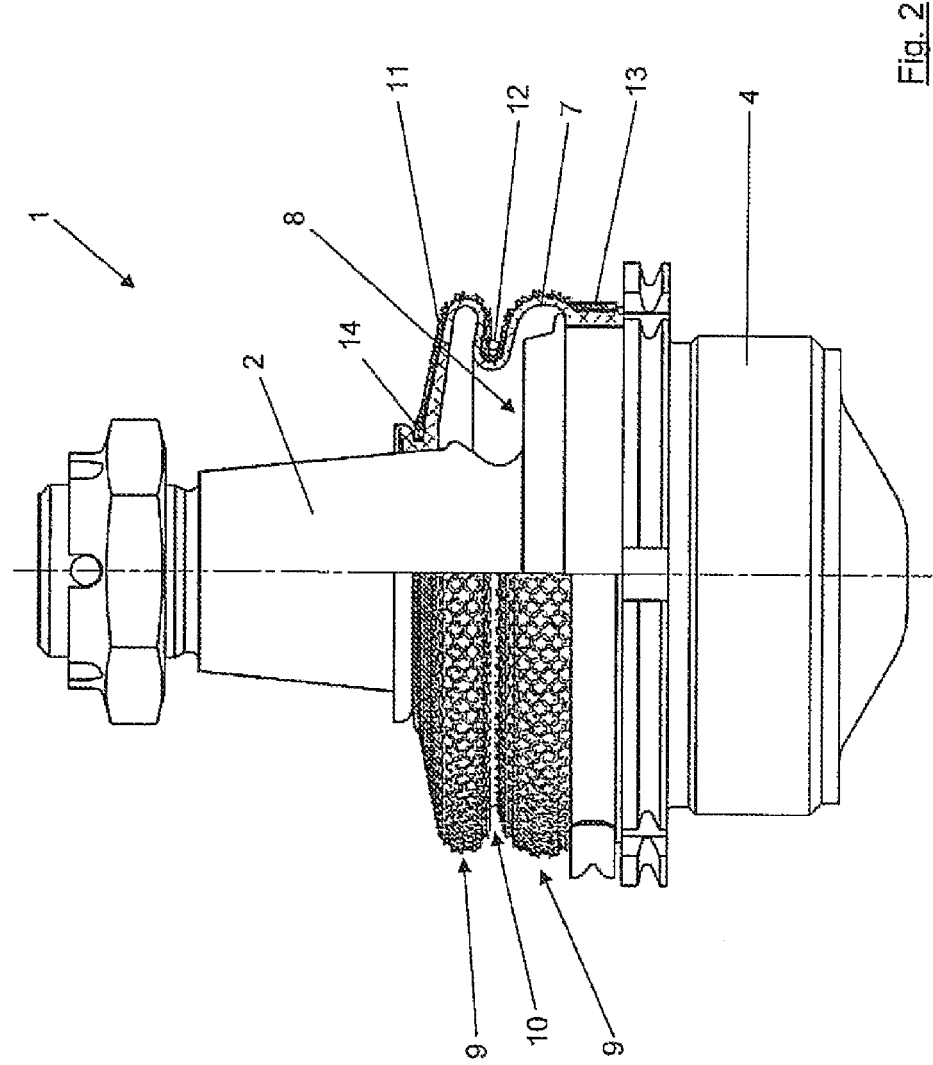
Figure 3:
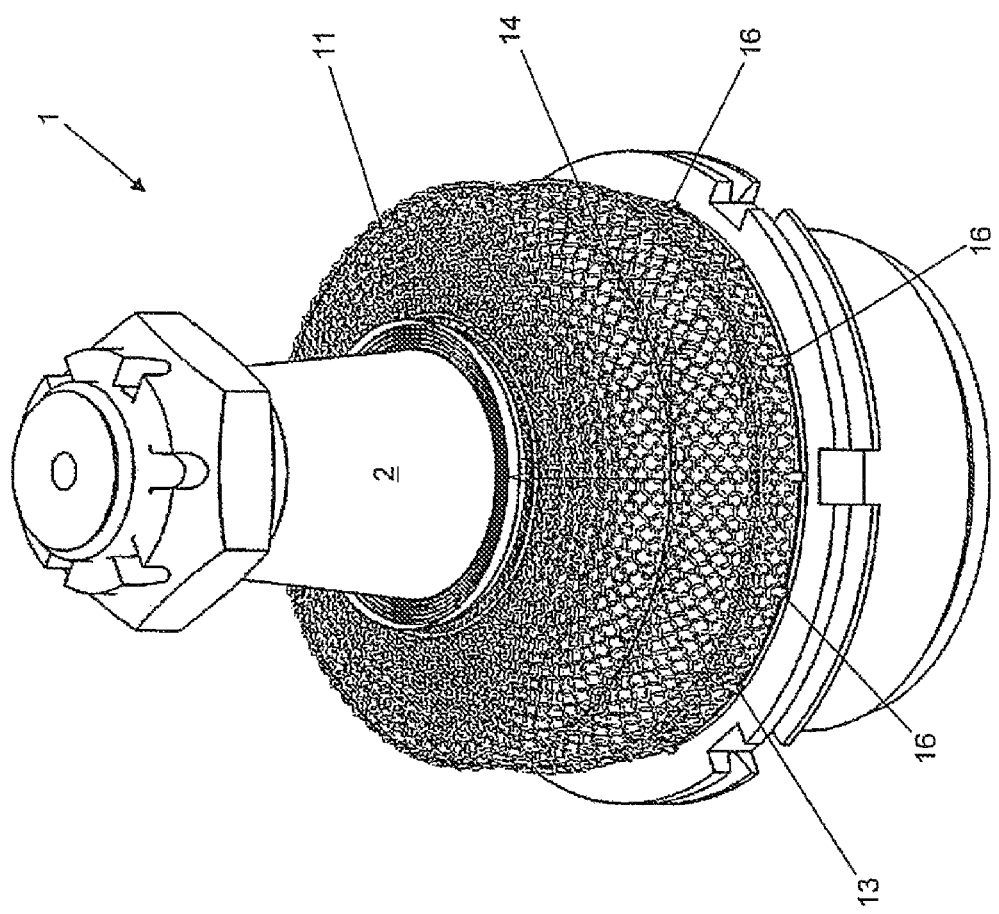

In the drawings:

FIG. 1 shows a schematic diagram of a joint and/or bearing arrangement with a protective cover placed externally over the sealing collar and affixed via outer tension rings made of a plurality of intermeshing metal rings, FIG. 2 a side view of the joint and/or bearing arrangement of FIG. 1, with the right half cut open, FIG. 3 a similar view as FIG. 1 of an alternative embodiment with an inner ring which engages with the metal rings via expanding catches for securing the protective cover.

Figure 4:
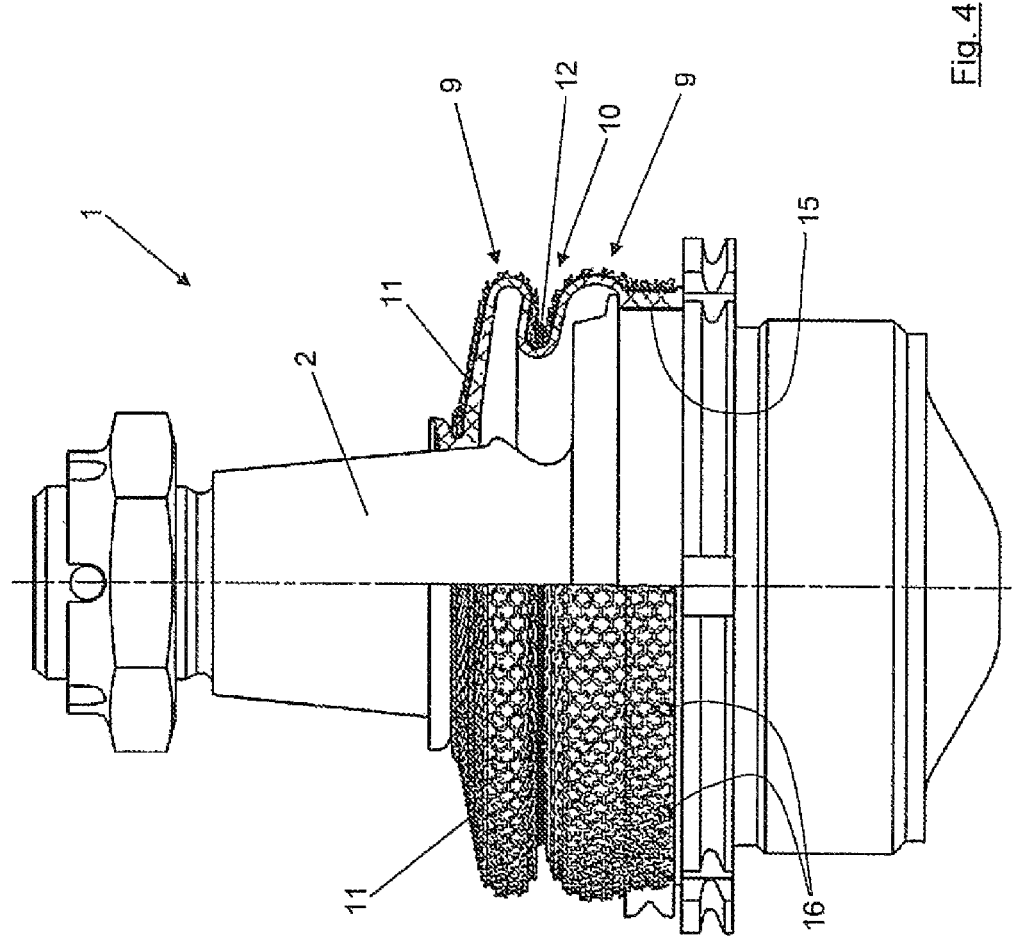
Figure 5:
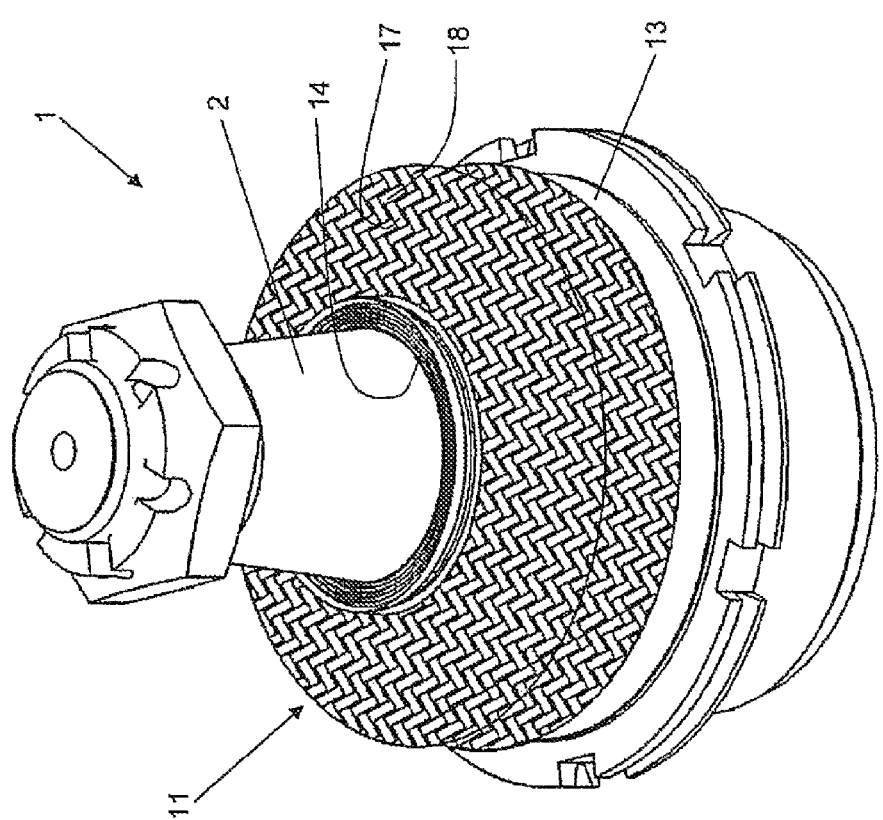
Figure 6:
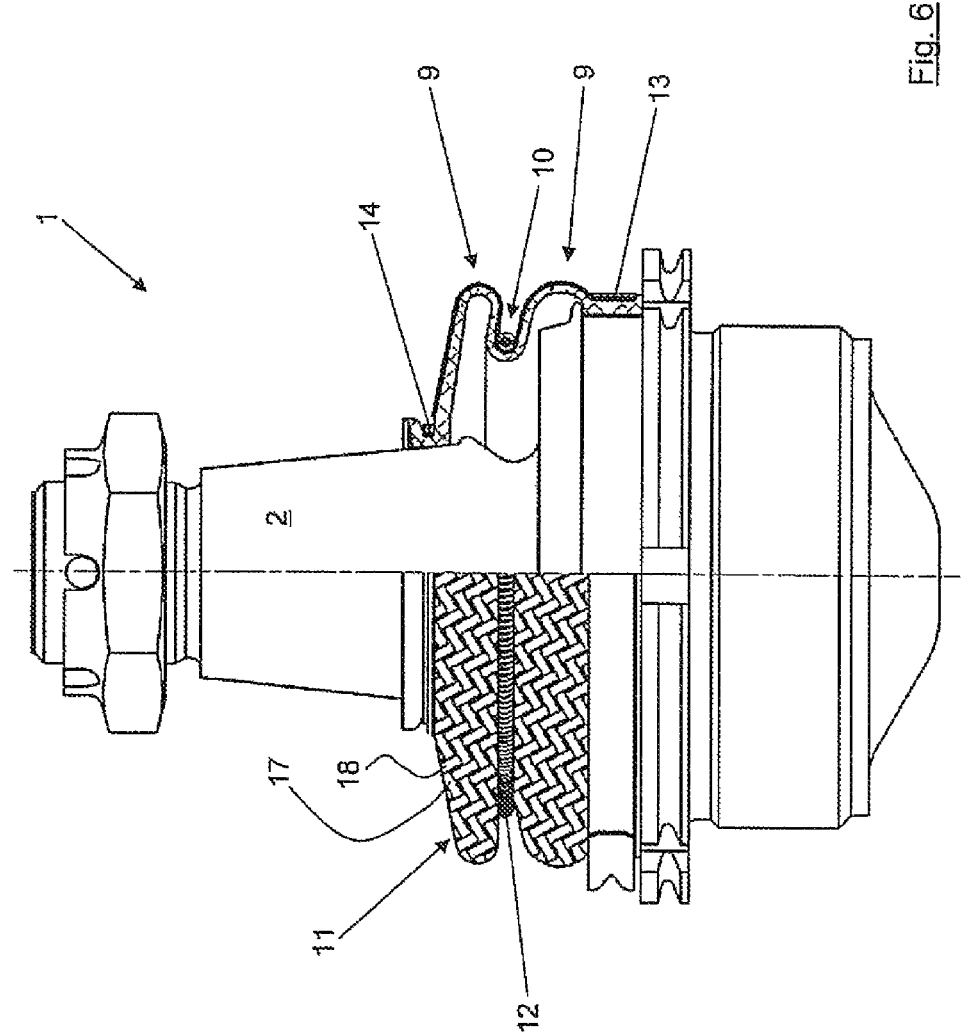

FIG. 4 a similar view as FIG. 1 of the alternative embodiment of FIG. 3, FIG. 5 a similar view as FIG. 1 of an alternative embodiment with a so-called flexible steel fabric for forming the protective cover, FIG. 6 a similar view as FIG. 2 of the alternative embodiment of FIG. 5, and FIG. 7 the joint and/or bearing arrangement of FIG. 3 in the installed position as supporting joint of a wheel in a chassis, with the pin pivoted outwardly relative to a supporting connecting rod.

DETAILED DESCRIPTION OF THE INVENTION

The pivot arrangement 1 according to FIG. 1 includes an axially extending pivot pin 2 with an enlarged head region 3 which is formed, for example, as a substantially spherical formed part. The head region 3 can be held in and in relation to a typically permanently lubricated joint socket inside a receiving a housing (joint socket) 4, which receives the head region, enabling swivel and/or tilt motion. The joint socket 4 can be essentially closed or preferably ring-shaped and formed outside the pin opening. Such tilt motion of the pin 2 with respect to the joint socket 4 is illustrated in FIG. 7.

The radially outer part of the joint socket 4 is in turn surrounded at least in part by a receiving space operating as a housing 5. Joint socket 4 and receiving space 5 together form a bearing assembly. The housing 5 need not be a separate component, but can also be an integral part of a connecting rod 6 which surrounds, for example, the installed pivot arrangements 1, as shown in FIG. 7. The connecting rod 6 can be fabricated, for example, by extrusion-coating or extrusion-molding with liquid, hot material, for example by the zinc die-casting, whereby the connecting rod 6 is unyielding after cool down with stable dimensions and can form an integral housing 5 without additional finish machining.

The joint and/or bearing arrangement 1 further includes a sealing collar 7 which is frequently configured as sealing bellow or boot. The sealing collar 7 continues from the bearings unit in the region of the opening 8 for the pin 2 and sealingly surrounds one of the end regions of the pin 2 facing the bearings unit. To enable the pin 2 to move in the bearing unit, the sealing collar 7 has projecting bulges 9 and narrow undercuts 10. This allows even larger tilt angles (FIG. 7).

The radially outer surface of the sealing collar 7 is surrounded by a separate protective cover 11 which can conform to the contour of the sealing collar 7 and may be formed in many different ways. The protective cover 11 forms a pierce protection against external mechanical damage. More particularly, a joint and/or bearing arrangement 1 protected in this manner can be installed in chassis or steering components of motor vehicles, in particular in areas openly accessible from the outside. Joints of a tractor used in agricultural or forestry, of a Unimog, and the like can be constructed according to the invention to prevent external damage from rocks, branches and similar obstructions with sharp edges. This applies especially for standalone support joints in the chassis.

According to the first exemplary embodiment depicted in FIGS. 1 and 2, the protective cover 11 surrounds the sealing collar 7 much like a tubular cover over its entire circumference and can contact both the bulges 9 and the undercuts 10, while still being able to move relative to the sealing collar 7.

The protective cover 11 is elastic throughout and allows over its course regions with different diameters.

According to the first exemplary embodiment, the radially outer ends of the protective cover 11 can be held, for example, by the externally applied, wide tension rings 13, 14, with the tension of the tension rings 13, 14 controllable by a the screw clamping mechanism. An additional rubber ring or another spring ring 12 or the like can provide contact between the protective cover 11 and the outer surface of the sealing collar 7 inside the undercut 10.

In this way, the installed protective cover can over its entire course contact almost the entire area of the outer surface of the sealing collar 7 and thereby prevent friction at isolated points, for example at bulges 9. This conformity is made possible in the first exemplary embodiment of FIGS. 1 and 2 by constructing the protective cover 11 from a number of intermeshing metal rings, each having, for example, a diameter of about two to five millimeters, in particular three to four millimeters, and a thickness of, for example, one to three millimeters. The tubular cover 11 can also be supplied in different diameters and therefore be pulled over sealing collars 7 of different sizes.

Due to their intermeshing structure, the rings can freely move in all directions. The protective cover 11 can hence contact and closely follow the contour of the bellow-shaped sealing collar, with the aforementioned optional outer spring rings urging the protective cover 11 in contact with the radially inner folds 10 of the bellow 7. On the other hand, the rings are sufficiently small so as to form a good pierce protection.

Such ring fabric is advantageously made of a metallic material, in particular stainless Cr—Ni steel, and can—unlike a surrounding bell—be easily spray-cleaned with a hose. The ring diameters are sufficiently large to enable scouring of dirt, thus preventing dirt from collecting between the cover 11 and the sealing collar 7.

As illustrated in FIGS. 3 and 4, instead of holding the cover 11 with the outer tension rings 13, 14, retainer rings 15 can be placed directly on the axial ends of the sealing collars 7, wherein the rings can engage in the ring fabric 11 with outwardly gripping locking tabs 16 having an element that is oriented opposite the pulling direction.

In another exemplary embodiment depicted in FIGS. 5 and 6, the protective cover can be made from a fabric having intersecting threads 17, 18 instead of from a ring fabric. This fabric can also be formed of steel, in particular stainless steel, and can be in complete contact with the sealing collar 7 after installation. Tension rings 13, 14 or spring rings 12 for conforming to the undercut 10 can also be provided.

The protective cover can also be connected with the sealing collar by using a suitable joining method, for example with adhesive or vulcanization.

The invention claimed is:

1. A pivot arrangement (1) comprising a pivot pin (2) having a substantially spherical enlarged head received in a joint socket in which the head swivels, tilts, or both swivels and tilts, the pivot pin (2) is movable with respect to a receiving support unit, wherein the pivot pin (2) is at least partially surrounded by a circumferential sealing collar (7), and wherein the sealing collar (7) is disposed radially inward relative to a separate protective cover (11) which conforms to the sealing collar having a bellow-shape, wherein the protective cover (11) is secured in radially inwardly oriented folds (10) of the bellow-shape sealing collar (7) by outer spring rings (12) disposed radially outward relative to the sealing collar (7) and the protective cover (11);

wherein the protective cover (11) comprises a steel fabric of interconnected rings.

2. The pivot arrangement (1) according to claim 1, wherein the protective cover (11) forms a pierce protection.

3. The pivot arrangement (1) according to claim 1, wherein the protective cover (11) entirely covers an exterior surface of the sealing collar (7).

4. The pivot arrangement (1) according to claim 1, wherein the protective cover (11) is elastic.

5. The pivot arrangement (1) according to claim 1, wherein the installed protective cover (11) is arranged so as to contact the outer surface of the sealing collar (7).

6. The pivot arrangement (1) according to claim 1, wherein the protective cover (11) is formed of a metallic material.

7. The pivot arrangement (1) according to claim 6, wherein the protective cover (11) comprises a steel or carbon fiber fabric with intersecting threads (17; 18).

8. The pivot arrangement (1) according to claim 6, wherein the metallic material is stainless steel.

9. The pivot arrangement (1) according to claim 1, wherein the protective cover (11) has a thickness from one to three millimeters, with each ring having a diameter of three to four millimeters.

10. The pivot arrangement (1) according to claim 1, wherein the sealing collar has two axial ends and the protective cover (11) is attached to both axial ends of the sealing collar (7) with ring-shaped fastening elements (13; 14; 15).

11. The pivot arrangement (1) according to claim 1, wherein the protective cover (11) is adapted to be retrofitted on existing joint or bearing arrangements (1).

12. The pivot arrangement (1) according to claim 1, wherein the pivot pin (2) has a head region (3).

13. A motor vehicle with at least one pivot arrangement (1) according to claim 1.

14. The motor vehicle according to claim 13, wherein the pivot arrangement (1) forms a support bearing for an independent wheel of a vehicle used in agriculture, forestry or military.

15. The motor vehicle according to claim 13, wherein the at least one pivot arrangement is in a chassis or steering components.

16. The pivot arrangement (1) according to claim 1, wherein the outer spring rings provide contact between the protective cover (11) and the outer surface of the sealing collar (7).

* * * * *